United States Patent
Rudberg

(10) Patent No.: US 7,920,660 B2
(45) Date of Patent: Apr. 5, 2011

(54) METHOD AND ARRANGEMENT FOR REMOVING DC OFFSET FROM DATA SYMBOLS

(75) Inventor: Mikael Rudberg, Linköping (SE)

(73) Assignee: Infineon Technologies Wireless Solutions Sweden AB, Kista (SE)

( * ) Notice: Subject to any disclaimer, the term of this patent is extended or adjusted under 35 U.S.C. 154(b) by 1869 days.

(21) Appl. No.: 10/852,652

(22) Filed: May 24, 2004

(65) Prior Publication Data
US 2004/0240594 A1    Dec. 2, 2004

(30) Foreign Application Priority Data
May 26, 2003 (SE) .................... 0301538

(51) Int. Cl.
*H03D 1/04* (2006.01)
(52) U.S. Cl. ........ 375/346; 375/260; 375/348; 375/347; 370/208; 370/204; 370/509; 370/512; 370/471
(58) Field of Classification Search .............. 375/346, 375/260, 316, 317, 267, 347, 348; 370/208, 370/210, 206, 515, 204, 509, 512, 471, 514
See application file for complete search history.

(56) References Cited

U.S. PATENT DOCUMENTS

| | | | | |
|---|---|---|---|---|
| 5,949,829 | A | 9/1999 | Kawai | 375/334 |
| 6,370,205 | B1 * | 4/2002 | Lindoff et al. | 375/319 |
| 6,546,055 | B1 * | 4/2003 | Schmidl et al. | 375/244 |
| 7,088,787 | B2 * | 8/2006 | Wang et al. | 375/316 |
| 7,302,022 | B2 * | 11/2007 | Kim et al. | 375/345 |
| 7,693,036 | B2 * | 4/2010 | Sun et al. | 370/208 |
| 2002/0176483 | A1 * | 11/2002 | Crawford | 375/137 |
| 2002/0181509 | A1 * | 12/2002 | Mody et al. | 370/480 |
| 2003/0133518 | A1 | 7/2003 | Koomullil et al. | 375/326 |
| 2003/0152156 | A1 * | 8/2003 | Cuypers et al. | 375/260 |

FOREIGN PATENT DOCUMENTS

| | | |
|---|---|---|
| EP | 0 719 013 A2 | 5/1995 |
| EP | 0 895 385 A1 | 7/1997 |
| EP | 1 077 571 A2 | 8/2000 |
| JP | 2003032216 A | 1/2003 |
| WO | WO 00/45523 | 8/2000 |
| WO | WO 03/028279 | 4/2003 |

* cited by examiner

*Primary Examiner* — David C Payne
*Assistant Examiner* — Rahel Guarino
(74) *Attorney, Agent, or Firm* — Dicke, Billig & Czaja, PLLC

(57) ABSTRACT

To remove DC offset from received data symbols having cyclic prefixes in a data communication system, means (5) are provided for determining the location of the cyclic prefixes, means (3) are provided for calculating the DC offset by calculating a mean value of at least one data symbol without its cyclic prefix and means (4) are provided for subtracting the calculated DC offset from said at least one data symbol with its cyclic prefix.

12 Claims, 1 Drawing Sheet

METHOD AND ARRANGEMENT FOR REMOVING DC OFFSET FROM DATA SYMBOLS

PRIORITY

This application claims priority to Swedish application no. 0301538-5 filed May 26, 2003.

TECHNICAL FIELD OF THE INVENTION

The present invention relates to data communication systems in general and more specifically to a method and an arrangement for removing DC offset from received data symbols in such systems.

BACKGROUND OF THE INVENTION

The invention will be described in connection with a data communication system utilizing orthogonal frequency division multiplexing (OFDM). However, it is to be understood that the invention is not limited to systems utilizing OFDM.

In OFDM, the data symbols to be transmitted are mapped on a number of orthogonal sub carriers. A so-called cyclic prefix (CP) is appended to each data symbol in order to reduce problems with multipath propagation. The CP is a copy of the last part of the data symbol.

During any type of transmission and reception of data symbols various types of distortions are caused in the signal. This is also true in systems utilizing OFDM. In OFDM systems two types of distortion are caused, namely DC offset which origins from various parts of the receiver and may vary from data symbol to data symbol, and frequency offset which origins from a mismatch between oscillators in the transmitter and the receiver.

It should be pointed out that the DC offset is not DC in the sense that it is a stable function of the power of the receiver.

In packet based transmission protocols as for instance IEEE 802.11a the gain setting of the receiver may vary from packet to packet. Every time the gain changes, the DC offset will also change. There are also radio architectures that will cause a slowly varying DC offset.

One problem with the DC offset is that it limits the dynamic range available for the wanted signal. Another problem is that the DC offset may end up in the signal band when the frequency offset is corrected in the receiver. Therefore it is necessary to remove the DC offset in order to reduce the frequency offset, otherwise the performance degradation will be huge.

There are mainly two well-known methods for removing the DC offset from data symbols in communication systems utilizing OFDM.

In the first method, the received signal is filtered by means of a so-called notch filter. One disadvantage with the notch filter is that it is difficult to remove the DC offset without also filtering away some of the actual information. Also, the notch filter does not compensate for variations in the gain of the receiver.

In the second method the DC offset is estimated by means of averaging the received signal and subtracting the estimated DC offset from the signal. In packet based systems such as systems utilizing OFDM the average has to be calculated for a large number of consecutive data symbols in order to be accurate, resulting in a very long time to achieve a good estimate of the DC offset.

A known implementation of a receiver utilizing the above-mentioned second method for estimating and subtracting the DC offset is illustrated in FIG. 1.

In FIG. 1 an analog-to-digital converter (ADC) 1 with an input terminal I1 for receiving an input signal IN comprising data symbols with CPs is connected with its output terminal O1 to an input terminal I2 of a buffering circuit 2 and to an input terminal I3 of a DC offset estimation circuit 3. The buffering circuit 2 is connected with an output terminal O2 to one input terminal I4 of a subtracter 4. The DC offset estimation circuit 3 is connected with an output terminal O3 to another input terminal I4' of the subtracter 4. The subtracter 4 has an output terminal O4 for an output signal OUT.

The data symbols that carry the information in the received signal are usually preceded by a so-called training sequence comprising training symbols. Among other things, this sequence serves to synchronize the transmitter and the receiver. During the reception of the training sequence DC offset estimation and removal is normally not performed. Nonetheless, received data symbols of the training sequence are used in order to form the base for calculating an initial DC offset estimate for the first data symbol actually carrying information. In this manner the first data symbol which carries information can be corrected with regard to DC offset.

The input signal IN is fed to the input terminal I1 of the ADC 1. After analog-to-digital conversion each data symbol of the signal is fed to and delayed in the buffering circuit 2. Simultaneously, the data symbols are fed to the input terminal I3 of the DC offset estimation circuit 3. In the DC offset estimation circuit 3 a DC offset estimate is calculated by averaging a predetermined number of the data symbols. From the beginning these data symbols can comprise data symbols actually carrying information and/or data symbols from the training sequence.

Each data symbol is delayed in the buffering circuit 4 until a DC offset estimate has been provided by the DC offset estimation circuit 3. Since a large number of symbols have to be included in order to achieve an accurate DC offset estimate, the introduced delay is substantial.

Subsequently, each data symbol from the buffering circuit 2 and the DC offset estimate from the DC offset estimation circuit 3 are fed to the subtracter 4, where the DC offset estimate is subtracted from each data symbol. The output terminal O4 of the subtracter 4 then provides the corrected data symbol as the output signal OUT.

As mentioned above, the known method is time-consuming and not so accurate.

SUMMARY OF THE INVENTION

The object of the invention is to provide a faster and more reliable method and arrangement for estimating and removing DC offset from received data symbols each having a cyclic prefix in a data communication system.

This is attained in that the DC offset is calculated by determining the location of the cyclic prefix of at least one data symbol, calculating a mean value of the at least one data symbol without its cyclic prefix and subtracting the calculated DC offset from the same data symbol with its cyclic prefix.

This is also attained by the arrangement according to the invention which comprises means for determining the location of the cyclic prefix of at least one data symbol, means for calculating the DC offset by calculating a mean value of the at least one data symbol without its cyclic prefix and means for subtracting the calculated DC offset from said at least one symbol with its cyclic prefix.

The method and the arrangement according to the invention estimates and removes the DC offset from a received data symbol.

BRIEF DESCRIPTION OF THE DRAWING

The invention will be described more in detail below with reference to the appended drawing in which.

DESCRIPTION OF THE INVENTION

Figure 1:
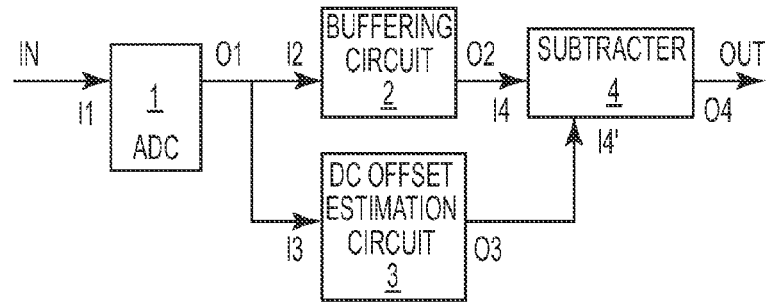
FIG. 1 described above shows a block diagram of a known arrangement in a receiver in a data communication system.
Figure 2:
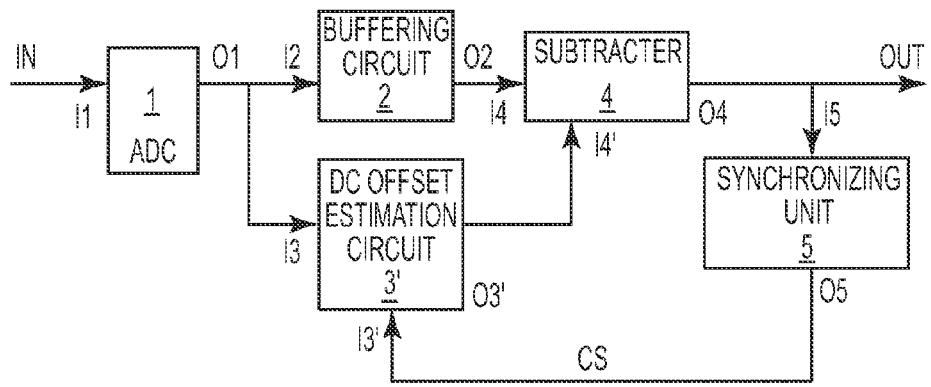
FIG. 2 shows a block diagram of a first embodiment of an arrangement according to the invention.

Blocks in FIG. 2 that are identical to blocks in FIG. 1 are provided with identical reference numerals.

In FIG. 2 a synchronizing unit 5 is connected with an input terminal I5 to the output terminal O4 of the subtracter 4. The DC offset estimation circuit 3' is connected with an input terminal I3 to the output terminal O1 of the ADC 1, and with an input terminal I3' to an output terminal O5 of the synchronizing unit 5. The synchronizing unit 5 is a common part of a receiver, but usually not utilized until later in the signal processing in order to remove CPs from the data symbols.

The synchronizing unit 5 analyzes a received data symbol, preferably one of the aforementioned training symbols, and detects the boundaries of the data symbol i.e. determines the location of the CP of the data symbol. The location of the CP of each following data symbol can then be determined by means of a simple calculation or by individual detection. In order to supply the information of the location of the CPs to the DC offset estimation circuit 3' the synchronizing unit 5 in FIG. 2 according to the invention generates a control signal CS. The output terminal O5 of the synchronizing unit 5 feeds the control signal CS to the input terminal I3' of the DC offset estimation circuit 3'.

In FIG. 2 an input signal IN comprising data symbols with CPs is applied to the input terminal I1 of the ADC 1. After analog-to-digital conversion in the ADC 1, a data symbol is applied to the input terminal I2 of the buffering circuit 2 and delayed by the same. The same data symbol is simultaneously applied to one input terminal I3 of the DC offset estimation circuit 3'.

The control signal CS enables the DC offset estimation circuit 3' to calculate a mean value of the data symbol without its CP. The mean value corresponds to the DC offset for the data symbol.

Subsequently, both the data symbol with its CP from the buffering circuit 2 and the calculated DC offset from the DC offset estimation circuit 3' are fed to the input terminals I4, I4' of the subtracter 4. In the subtracter 4 the calculated DC offset is subtracted from the data symbol with its CP from the buffering circuit 2. Thereby a data symbol without DC offset is provided. The data symbol is then provided as an output signal OUT at the output terminal O4 of the subtracter 4.

The first embodiment of a method and an arrangement according to the invention ensures that a data symbol without DC offset is provided. However, since the DC offset is calculated and removed for each individual data symbol, a delay is introduced.

A second embodiment of an arrangement according to the invention is described with reference to FIG. 3.

Figure 3:
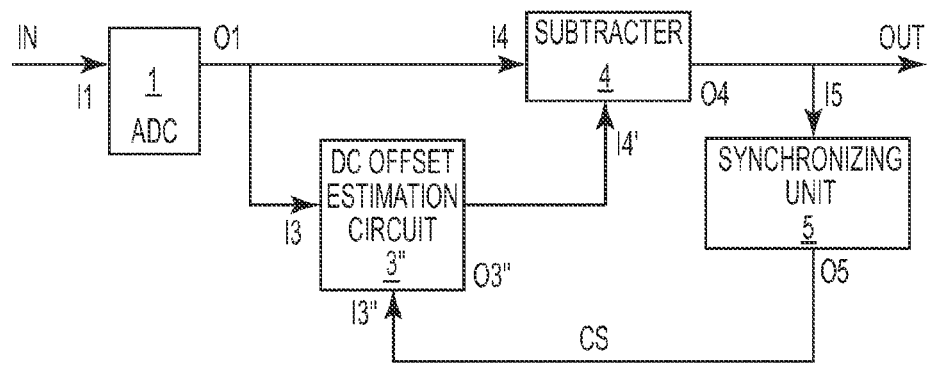
FIG. 3 shows a block diagram of a second embodiment of an arrangement according to the invention.

Blocks in FIG. 3 that are identical to blocks in FIG. 2 are provided with identical reference numerals.

The arrangement in FIG. 3 differs from the embodiment in FIG. 2 in that there is no buffering circuit 2 in FIG. 3. Instead the output terminal O1 of the ADC 1 is connected directly to an input terminal I4 of the subtracter 4.

In the DC offset estimation circuit 3'' in FIG. 3 a mean value is calculated for each of a predetermined number of consecutive data symbols excluding their cyclic prefixes CP. This is performed in the same manner as in the embodiment in FIG. 2. A DC offset is then calculated by combining the calculated mean values to a weighted average.

Subsequently a new data symbol with its CP from the ADC 1 and the calculated DC offset from the DC offset estimation circuit 3'' are fed to the input terminals I4, I4' of the subtracter 4, where the calculated DC offset is subtracted from the new data symbol with its CP. Thereby a data symbol without a DC offset is provided as an output signal OUT at the output terminal O4 of the subtracter 4.

The manner in which this second method according to the invention is used can vary within one system as well as from one system to another. It is quite possible to use the same calculated DC offset estimate for a number of data symbols as well as calculating a new DC offset for each data symbol.

This second method embodiment of the method according to the invention is preferably used in applications that are highly sensitive to delays in the data stream, such as Digital Video Broadcast.

The method according to the invention is applicable to a sampled data stream as well as to a time-continuous one.

I claim:

1. A method of removing DC offset from received data symbols having a cyclic prefix, comprising the steps of:
   determining the location of the cyclic prefixes,
   calculating the mean value of at least one data symbol without its cyclic prefix, and
   subtracting the calculated mean value from said at least one data symbol with its cyclic prefix.

2. The method according to claim 1, wherein the step of delaying the at least one data symbol during the step of calculating the mean value.

3. The method according to claim 1, wherein the step of generating a control signal in response to the determined location of the cyclic prefixes.

4. The method according to claim 2, wherein the step of generating a control signal in response to the determined location of the cyclic prefixes.

5. An arrangement for removing DC offset from received data symbols each having a cyclic prefix, comprising:
   means for determining the location of the cyclic prefixes,
   means for calculating the mean value of at least one data symbol without its cyclic prefix, and
   means for substracting the calculated mean value from said at least one symbol with its cyclic prefix.

6. An arrangement according to claim 5, comprising a buffering circuit for delaying the at least one data symbol.

7. An arrangement according to claim 5, wherein said means for determining the location of the cyclic prefixes are adapted to generate a control signal and to supply said control signal to said means for calculating the mean value.

8. An arrangement according to claim 6, wherein said means for determining the location of the cyclic prefixes are adapted to generate a control signal and to supply said control signal to said means for calculating the mean value.

9. An arrangement for removing DC offset from received data symbols each having a cyclic prefix, comprising:
   a synchronizing unit for determining the location of the cyclic prefixes,
   an estimation circuit for calculating the mean value of at least one data symbol without its cyclic prefix, and
   a subtractor for substracting the calculated mean value from said at least one symbol with its cyclic prefix.

10. An arrangement according to claim 9, comprising a buffering circuit for delaying the at least one data symbol.

11. An arrangement according to claim 9, wherein said synchronization unit is adapted to generate a control signal and to supply said control signal to said estimation circuit.

12. An arrangement according to claim 10, wherein said synchronization unit is adapted to generate a control signal and to supply said control signal to said estimation circuit.

* * * * *